(12) United States Patent
Thomas et al.

(10) Patent No.: US 8,132,772 B1
(45) Date of Patent: Mar. 13, 2012

(54) LINEAR AND/OR CURVILINEAR RAIL MOUNT SYSTEM

(75) Inventors: Jackie D. Thomas, Huntsville, AL (US); Lawanna L. Harris, Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 428 days.

(21) Appl. No.: 12/567,451

(22) Filed: Sep. 25, 2009

(51) Int. Cl.
*A47B 97/00* (2006.01)
(52) U.S. Cl. ........................................ 248/500; 248/429
(58) Field of Classification Search .................. 248/500, 248/49, 200, 220.21, 221.11, 222.13, 223.41, 248/225.11, 231.9, 424, 429
See application file for complete search history.

(56) References Cited

U.S. PATENT DOCUMENTS

| | | | |
|---|---|---|---|
| 3,337,172 A * | 8/1967 | Jackson | 248/222.51 |
| 4,593,824 A * | 6/1986 | Pfeifer | 211/57.1 |
| 5,406,455 A | 4/1995 | Devenish, III | |
| 5,644,470 A | 7/1997 | Benedict et al. | |
| 6,119,878 A * | 9/2000 | Zen | 211/94.01 |
| 7,032,862 B2 | 4/2006 | Landes et al. | |
| 7,307,851 B2 | 12/2007 | Dimarco | |
| 2003/0116682 A1* | 6/2003 | Finco et al. | 248/49 |
| 2004/0017667 A1 | 1/2004 | Nasu et al. | |
| 2007/0221595 A1 | 9/2007 | Chen | |
| 2008/0121762 A1 | 5/2008 | Slatosch et al. | |
| 2008/0239688 A1 | 10/2008 | Casey et al. | |
| 2009/0129885 A1* | 5/2009 | Csik et al. | 411/103 |
| 2010/0294906 A1* | 11/2010 | Klepack et al. | 248/231.9 |

* cited by examiner

*Primary Examiner* — Ramon Ramirez
(74) *Attorney, Agent, or Firm* — Peter J. Van Bergen; James J. McGroary

(57) ABSTRACT

One or more linear and/or curvilinear mounting rails are coupled to a structure. Each mounting rail defines a channel and at least one cartridge assembly is engaged in the channel. Each cartridge assembly includes a housing that slides within the channel. The housing defines a curvilinearly-shaped recess longitudinally aligned with the channel when the housing is in engagement therewith. The cartridge assembly also includes a cleat fitted in the recess for sliding engagement therealong. The cleat can be coupled to a fastener that passes through the mounting rail and the housing when the housing is so-engaged in the channel. The cleat is positioned in the recess by a position of the fastener.

27 Claims, 4 Drawing Sheets

LINEAR AND/OR CURVILINEAR RAIL MOUNT SYSTEM

ORIGIN OF THE INVENTION

The invention was made by employees of the United States Government and may be manufactured and used by or for the Government for governmental purposes without the payment of any royalties.

BACKGROUND OF THE INVENTION

1. Field of the Invention

This invention relates to rail-based mounting system. More specifically, the invention is a rail mount system using linear and/or curvilinear rails that allows a component to be mounted thereto without the use of tools.

2. Description of the Related Art

Frequently, components or assemblies are mounted in a structure by first attaching some type of mounting rail or rails to the structure, and then attaching a component or assembly to the rail(s) using some type of fastener requiring the use of a fastening tool. In some installation applications, very little room exists thereby making the use of a fastening tool very difficult. Typically, this difficulty is addressed by using one person to hold the component/assembly in place while another attempts to fasten the component/assembly to the mounting rail(s).

Another problem with component or assembly mounting is that an existing structure does not always present sufficient flat installation surfaces as the only available mounting regions present irregularly-shaped surfaces. In these situations, some type of custom or "jury-rigged" mounting is used thereby increasing the cost and/or complexity of the mounting, as well as possibly introducing mounting integrity issues/concerns.

SUMMARY OF THE INVENTION

Accordingly, it is an object of the present invention to provide system for mounting a component or assembly to a structure that does not require the use of tools for such mounting.

Another object of the present invention is to provide a system for mounting a component or assembly to an irregularly-shaped surface.

Other objects and advantages of the present invention will become more obvious hereinafter in the specification and drawings.

In accordance with the present invention, a system for mounting a component includes at least one mounting rail coupled to a structure. Each mounting rail defines a channel. At least one cartridge assembly is engaged in the channel. Each cartridge assembly includes a housing for sliding engagement within the channel. The housing defines a curvilinearly-shaped recess longitudinally aligned with the channel when the housing is in engagement therewith. The cartridge assembly also includes a cleat fitted in the recess for sliding engagement therealong. The cleat can be coupled to a fastener that passes through the mounting rail and the housing when the housing is so-engaged in the channel. The cleat is positioned in the recess by a position of the fastener.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein:

FIG. 5B is an isolated perspective view of the cartridge assembly in FIG. 5A from the side thereof that the threaded bolt passes through;

FIG. 6B is an isolated perspective view of the cartridge assembly in FIG. 6A from the side thereof that the threaded bolt passes through.

DESCRIPTION OF THE PREFERRED EMBODIMENT(S)

Figure 1:
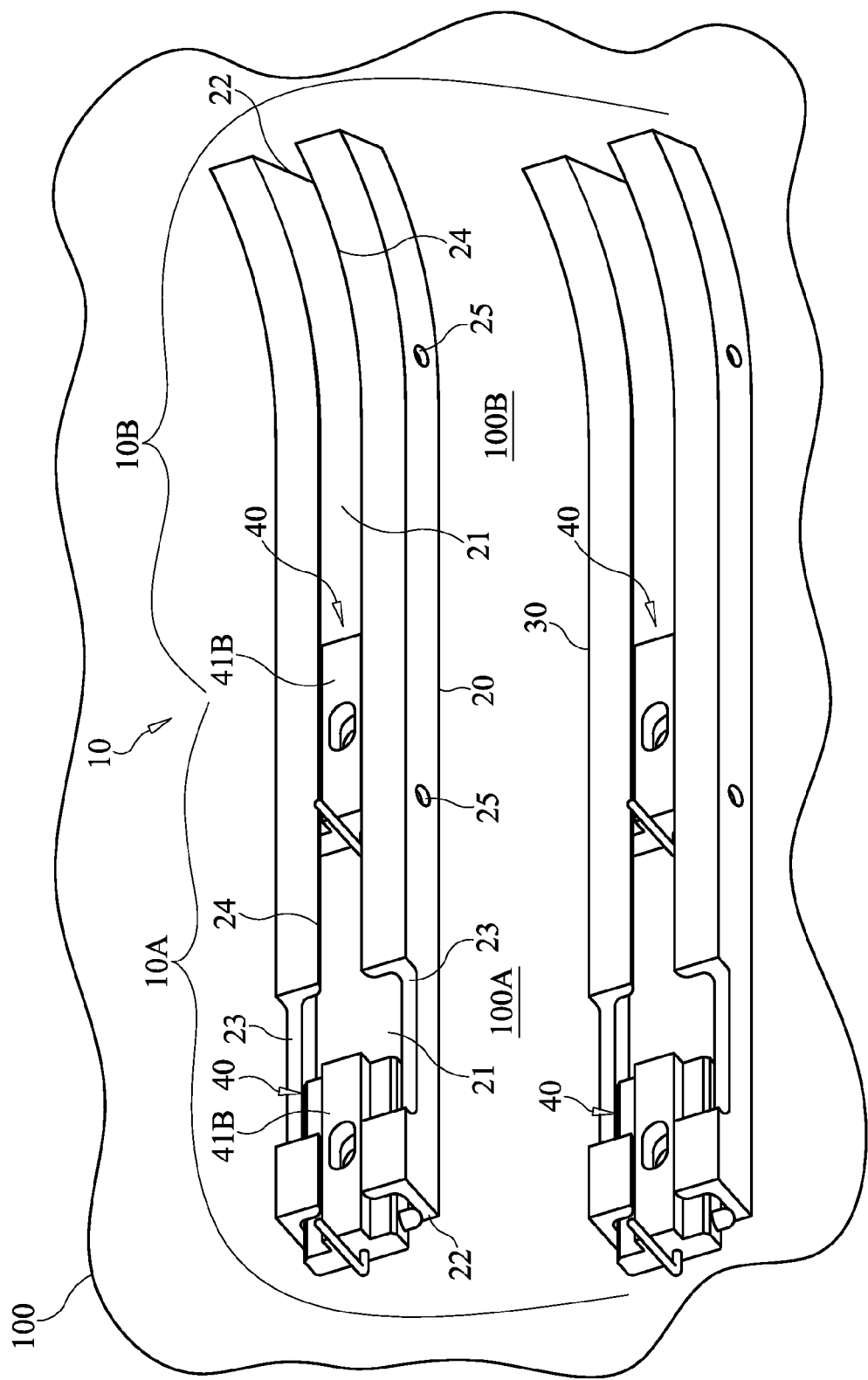
FIG. 1 is a perspective view of a parallel-rail mount system in accordance with embodiment of the present invention.

Referring now to the drawings and more particularly to FIG. 1, a rail mount system in accordance with an embodiment of the present invention is shown and is referenced generally by numeral 10. In general, mount system 10 will be coupled to some structure 100, the choice of which is not a limitation of the present invention. Indeed, a great advantage of the present invention is that the mounting surface 100A of structure 100 can be planar or curved/irregular. That is, mount system 10 can be essentially in a plane that is parallel to a planar surface of structure 100, or mount system 10 can be shaped to in a curvilinear fashion to adapt to an irregular surface region of structure 100. Still further, mount system 10 could be constructed to transition from a planar portion of structure 100 to an irregular surface region thereof. Accordingly, FIG. 1 illustrates mount system 10 as having a linear portion 10A and a curvilinear portion 10B.

In the illustrated embodiment, mount system 10 includes two parallel rails 20 and 30 that are each coupled to structure 100 such that rails 20 and 30 remain parallel to one another along the lengths thereof. Note that this parallel relationship is maintained in both portions 10A and 10B of mount system 10. Rails 20 and 30 are typically identical in size and construction to simplify fabrication and/or installation in procedures. However, the present invention is not so limited as rails 20 and 30 could be different. Further, some installations might only require the use of one rail. Accordingly, it is to be understood that the novel features of mount system 10 can be used in a variety of embodiments without departing from the scope of the present invention.

In the illustrated embodiment, rails 20 and 30 are the same so that a description of rail 20 will be sufficient for an understanding of the present invention. Rail 20 is coupled to structure 100 by any conventional means (e.g., adhered, attached, integrated, etc.), the choice of which is not a limitation of the present invention. Rail 20 is made of a rigid material (e.g., metal, composite, etc.) and defines a channel 21 (e.g., a C-shaped channel as illustrated) along the operative length thereof. That is, rail 20 could include one or more appendages (not shown) to facilitate the coupling thereof to structure 100. As illustrated, the operative length of rail 20 spans portions 10A and 10B. Rail 20 defines one or more entrances for one or more cartridge assemblies 40 (two of which are installed in rail 20). For example, one or both ends 22 of rail 20 could be open to expose channel 21. Additionally or alternatively, rail 20 can have a notch 23 (or several ones thereof distributed along the length of rail 20) formed therein such that cartridge assembly 40 can be inserted therethrough for positioning in channel 21. Rail 20 is linear along portion 10A of mount system 10 and is curved along portion 10B. For both portions 10A and 10B, C-shaped channel 21 defines a slot 24 along the illustrated operative portion of rail 20. The purpose of slot 24 will become more apparent later herein.

Figure 2:
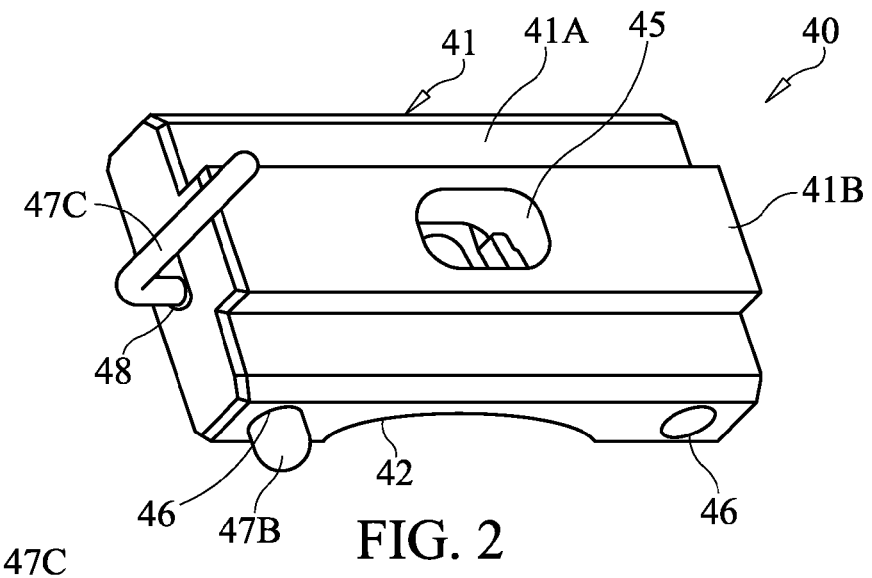
FIG. 2 is an isolated perspective view of an embodiment of a cartridge assembly used in the present invention.
Figure 3:
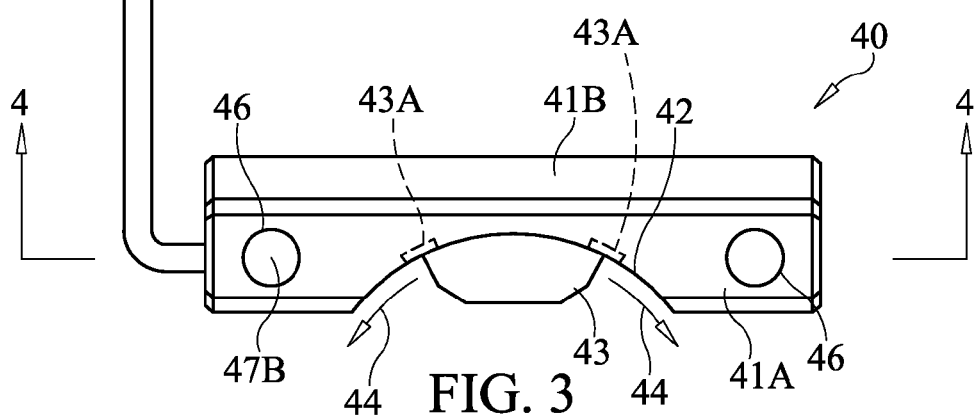
FIG. 3 is a side view of the cartridge assembly.
Figure 4:
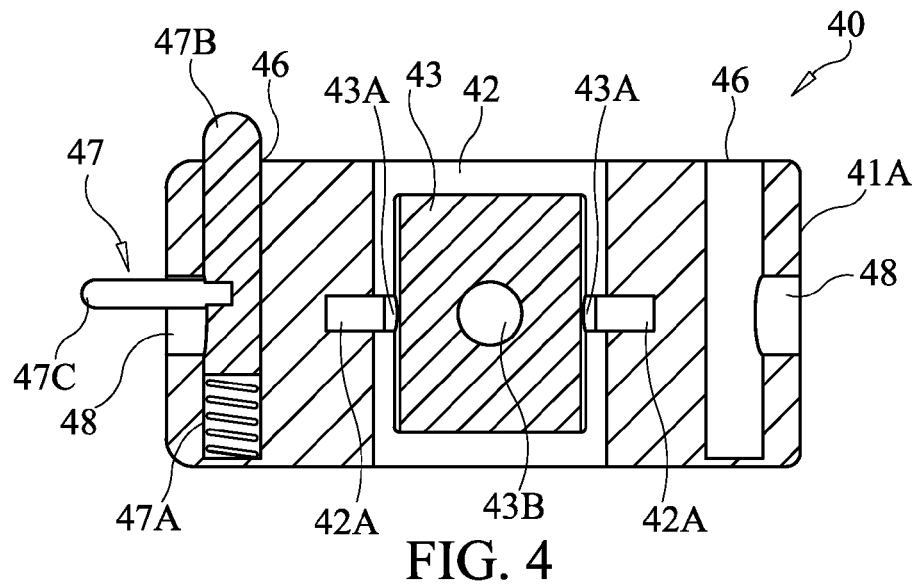
FIG. 4 is a cross-sectional view of the cartridge assembly taken along line 4-4 in FIG. 3.

Each cartridge assembly 40 is designed to slidingly engage channel 21 once cartridge assembly 40 is positioned therein. Referring additionally now to FIGS. 2-4, various isolated views of an embodiment of cartridge assembly 40 are presented. Cartridge assembly 40 includes a rigid housing 41 sized/shaped to slidingly engage channel 21. More specifically, in the illustrated embodiment, housing 41 includes a main body 41A and a longitudinal rib 41B where main body 41A slides in channel 21 while rib 41B slides in slot 24 (FIG. 1). On the opposing side of housing 41 and aligned with rib 41B is curved recess 42 formed in housing 41 such that recess 42 is longitudinally aligned in channel 21 when cartridge assembly is positioned therein. Cooperating with recess 42 is a shaped cleat 43 such that cleat 43 can be positioned at a variety of locations along recess 42 as illustrated by arrows 44 in FIG. 3. To keep cleat 43 squarely positioned in recess 42, cleat 43 includes a rib 43A that cooperates or rides in a slot 42A formed along recess 42. Cleat 43 further defines a female threaded portion 43B that is aligned with hole 45 in 41B. More specifically, hole 45 is larger that the opening end of threaded portion 43B such that threaded portion 43B remains in full communication with hole 45 for a variety of locations 44 of cleat 43.

Cartridge assembly 40 can also be equipped with a mechanism(s) to lock it into a desired position along rail 20. For example, in the illustrated embodiment, housing 40 defines one (or two) transverse wells 46 to support a lock pin arrangement 47 designed to cooperate with a hole (or recess) 25 formed in rail 20. Lock pin arrangement 47 is a spring-loaded pin assembly that includes longitudinally-aligned spring 47A and pin 47B. A manually-operated release bar 47C is coupled to pin 47B and is passed through a slot 48 of housing 41. When spring 47A is compressed, cartridge assembly 40 is slid in channel 21 until pin 47B is aligned with hole 25 whereby pin 47B is pushed into locked engagement with hole 25 by the force of spring 47A. When release bar 47C is moved to compress spring 47A, pin 47B is pulled within housing 41 to facilitate release of cartridge assembly 40 from its locked engagement with hole 25 of rail 20. Note that lock pin arrangement 47 can be placed at either end of housing 41 or at both ends thereof without departing from the scope of the present invention. Further, it is to be understood that other types of lock-and-release mechanisms could be used without departing from the scope of the present invention.

Figure 5A:
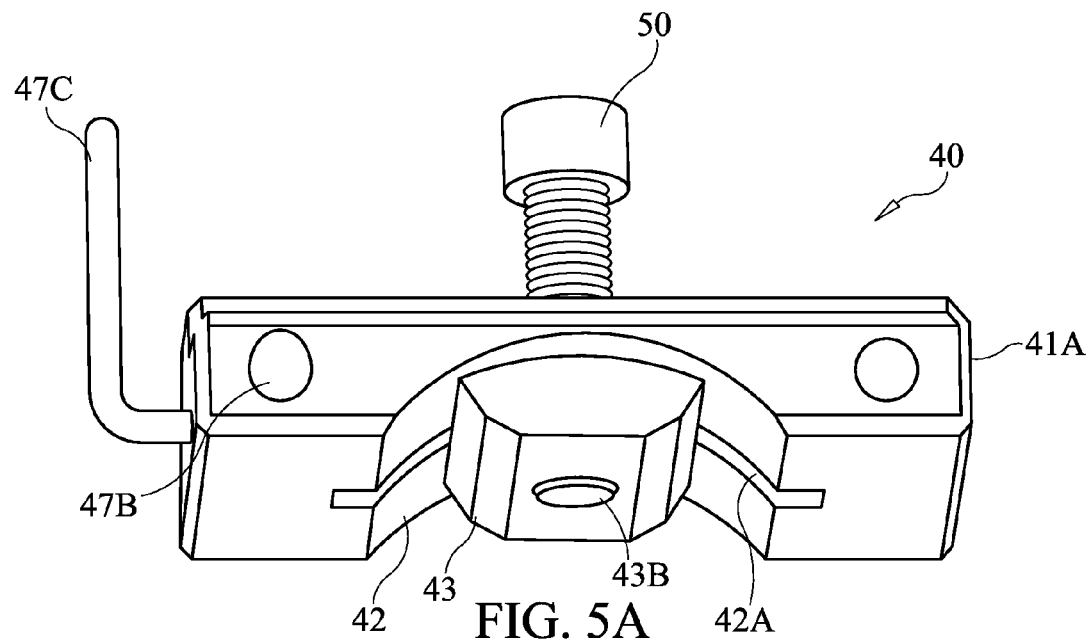
FIG. 5A is an isolated perspective view of the recess side of a cartridge assembly with its threaded cleat positioned by a threaded bolt cooperating therewith when the cartridge assembly resides in a linear section of a rail.
Figure 5B:
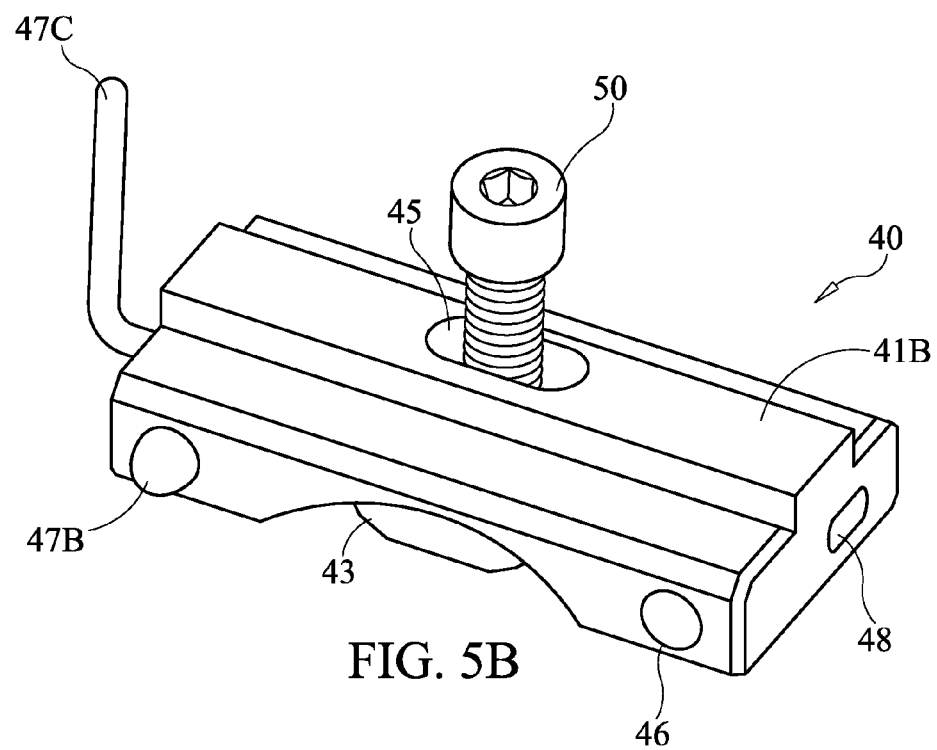

As mentioned above, the present invention allows a component to be mounted on planar or curved/irregularly-shaped structures without the use of any tools. This feature is of great value for large number of applications. These capabilities will be better understood with reference to FIGS. 5A, 5B, 6A, and 6B where cartridge assembly 40 is again illustrated in isolation. Referring first to FIGS. 5A and 5B, cartridge assembly 40 is illustrated as it would appear when cooperating with a linear portion of a mounting rail (e.g., rail 20). In accordance with the present invention, cartridge assembly 40 is first attached to a component (not shown to maintain clarity of illustration) that is to be mounted to rail 20. To do this, a threaded bolt or other fastener 50 is passed through a mounting hole (not shown) of the component. Threaded bolt 50 is then passed through hole 45 and threaded into threaded portion 43B of cheat 43. In this way, cartridge assembly 40 is now coupled to the component that is to be mounted to rail 20. Typically, additional cartridge assemblies will be coupled to the component. For example, the parallel rail example illustrated in FIG. 1 will typically make use of four such cartridge assemblies for a stable installation. Note that for a planar mounting surface utilizing linear rails, cleat 43 is centrally positioned along the length of recess 42 with bolt 50 extending perpendicularly to rib 41B and out of slot 24 (not shown in FIGS. 5A and 5B).

Figure 6A:
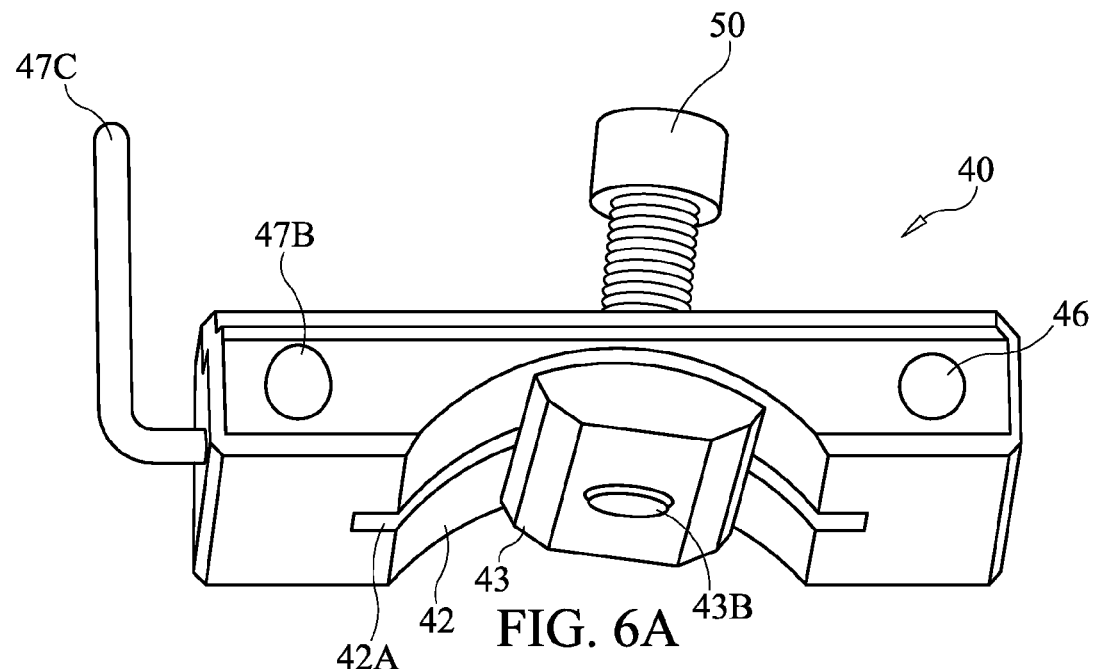
FIG. 6A is an isolated perspective view of the recess side of a cartridge assembly with its threaded cleat positioned by a threaded bolt cooperating therewith when the cartridge assembly resides in a curvilinear section of a rail.
Figure 6B:
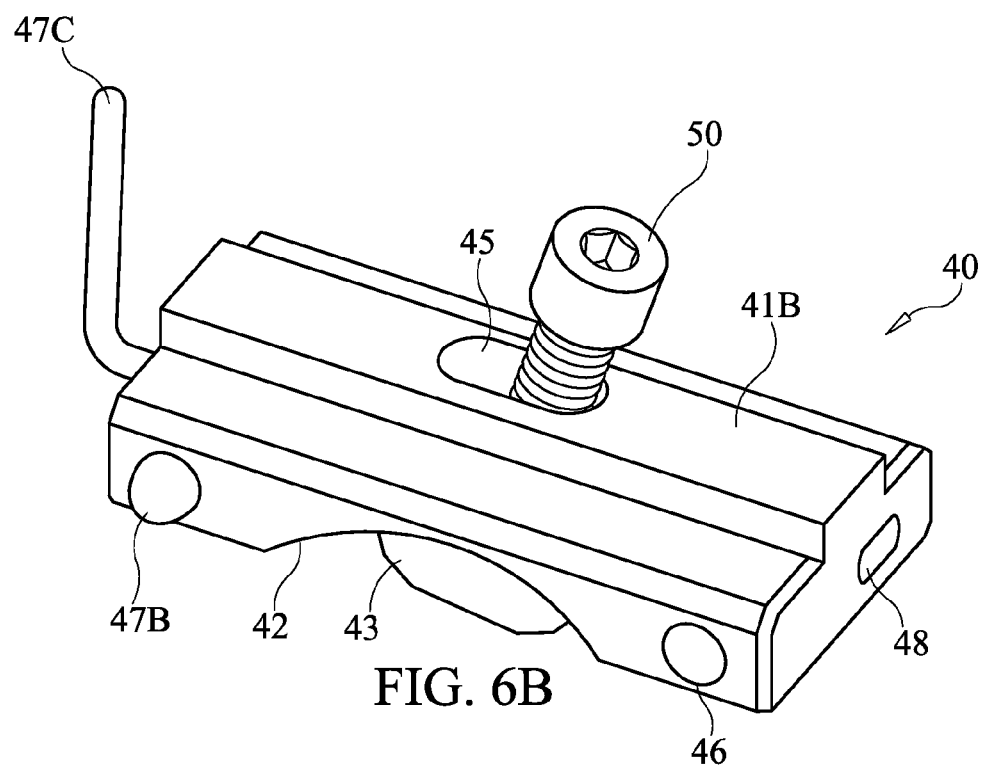

The present invention also readily adapts to use with curvilinear rails as will be readily apparent by reference to FIGS. 6A and 6B. That is, as cartridge assembly 40 encounters a curve in a mounting rail (e.g., rail 20), cleat 43 slides along recess 42 as governed by bolt 50 which is coupled to the component (not shown) experiencing the curve in the mounting rail. The loose maintenance of bolt 50 in the larger hole 45 allows bolt 50 to be angularly positioned relative to rib 41B as best seen in FIG. 6B.

The advantages of the present invention are numerous. One or more cartridge assemblies are coupled to a component that is be mounted to a structure. This assembly step is readily accomplished "off line" in a setting that is not space limited. One or more linear and/or curvilinear mounting rails are installed where needed. Then, the component with its cartridge assembly(ies) coupled thereto is simply positioned in a rail's channel and the component is slid to its installation position where it can be locked in place. Such locking can be readily integrated into the rail mount system in a variety of ways. No tools are required to mount the component to the rails. Accordingly, the present invention could be especially valuable where component mounting space is at a premium (e.g., avionics applications, spacecraft applications, computer or other electronic applications where space/size is at a premium, etc.).

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A system for mounting a component, comprising:
   first and second mounting rails arranged parallel to one another, each of said first and second mounting rails adapted to be coupled to a structure, each of said first and second mounting rails defining a channel therein; and
   a plurality of cartridge assemblies with each of said cartridge assemblies engaged in one said channel, each of said cartridge assemblies including
   (i) a housing for sliding engagement within said channel, said housing defining a curvilinearly-shaped recess longitudinally aligned with said channel when said housing is in said engagement therewith, and
   (ii) a cleat fitted in said recess for sliding engagement therealong, said cleat being adapted to be coupled to a fastener that is adapted to pass through one of said first and second mounting rails and said housing when said housing is so-engaged in said channel associated therewith, wherein said cleat is positioned in said recess by a position of the fastener.

2. A system as in claim 1, wherein each of said first and second mounting rails is linear.

3. A system as in claim 1, wherein each of said first and second mounting rails is curvilinear.

4. A system as in claim 1, wherein said plurality of cartridge assemblies comprise at least four of said cartridge assemblies.

5. A system as in claim 1, wherein an end of each of said first and second mounting rails is open such that said channel associated therewith can slidingly receive at least one of said cartridge assemblies through said end.

6. A system as in claim 1, wherein each of said first and second mounting rails has at least one notch formed at a position along the length thereof for allowing one of said cartridge assemblies to be received into said channel associated therewith.

7. A system as in claim 1, further comprising means for releasably locking each of said cartridge assemblies at a position along the length of said channel so-engaged.

8. A system for mounting a component, comprising:
first and second mounting rails arranged parallel to one another, each of said first and second mounting rails adapted to be coupled to a structure, each of said first and second mounting rails defining a channel therein, said channel being C-shaped along at least a portion of said channel's length to define a longitudinal slot along said portion; and
a plurality of cartridge assemblies with each of said cartridge assemblies engaged in one said channel, each of said cartridge assemblies including
(i) a housing for sliding engagement within said channel, said housing defining a curvilinearly-shaped recess longitudinally aligned with said slot and facing away therefrom when said housing is in said engagement with said channel, and
(ii) a cleat fitted in said recess for sliding engagement therealong, said cleat being adapted to be coupled to a fastener that is adapted to pass through one of said first and second mounting rails and said housing when said housing is so-engaged in said channel associated therewith, wherein said cleat is positioned in said recess by a position of the fastener.

9. A system as in claim 8, wherein each of said first and second mounting rails is linear.

10. A system as in claim 8, wherein each of said first and second mounting rails is curvilinear.

11. A system as in claim 8, wherein said plurality of cartridge assemblies comprise at least four of said cartridge assemblies.

12. A system as in claim 8, wherein an end of each of said first and second mounting rails is open such that said channel associated therewith can slidingly receive at least one of said cartridge assemblies through said end.

13. A system as in claim 8, wherein each of said first and second mounting rails has at least one notch formed at a position along the length thereof for allowing one of said cartridge assemblies to be received into said channel associated therewith.

14. A system as in claim 8, further comprising means for releasably locking each of said cartridge assemblies at a position along the length of said channel so-engaged.

15. A system for mounting a component, comprising:
first and second mounting rails arranged parallel to one another, each of said first and second mounting rails adapted to be coupled to a structure, each of said first and second mounting rails defining a channel therein, said channel being C-shaped along at least a portion of said channel's length to define a longitudinal slot along said portion; and
a plurality of cartridge assemblies with each of said cartridge assemblies engaged in one said channel, each of said cartridge assemblies including
(i) a housing for sliding engagement within said channel, said housing defining a curvilinearly-shaped recess longitudinally aligned with said slot and facing away therefrom when said housing is in said engagement with said channel, said housing further defining a hole in communication with a central region of said recess,
(ii) a cleat fitted in said recess for sliding engagement therealong and in alignment with said slot, said cleat including a threaded opening aligned with said hole in said housing, and
(iii) a threaded fastener passed through said hole and in loose engagement therewith for threaded engagement with said threaded opening in said cleat, wherein said threaded fastener extends through said slot when said housing is so-engaged in said channel, and wherein said cleat is positioned in said recess by a position of said threaded fastener.

16. A system as in claim 15, wherein each of said first and second mounting rails is linear.

17. A system as in claim 15, wherein each of said first and second mounting rails is curvilinear.

18. A system as in claim 15, wherein said plurality of cartridge assemblies comprise at least four of said cartridge assemblies.

19. A system as in claim 15, wherein an end of each of said first and second mounting rails is open such that said channel associated therewith can slidingly receive at least one of said cartridge assemblies through said end.

20. A system as in claim 15, wherein each of said first and second mounting rails has at least one notch formed at a position along the length thereof for allowing one of said cartridge assemblies to be received into said channel associated therewith.

21. A system as in claim 15, further comprising means for releasably locking each of said cartridge assemblies at a position along the length of said channel so-engaged.

22. A system for mounting a component, comprising:
at least one mounting rail adapted to be coupled to a structure, each said mounting rail defining a channel therein; and
at least one cartridge assembly engaged in said channel, each said cartridge assembly including
(i) a housing for sliding engagement within said channel, said housing defining a curvilinearly-shaped recess longitudinally aligned with said channel when said housing is in said engagement therewith, and
(ii) a cleat fitted in said recess for sliding engagement therealong, said cleat being adapted to be coupled to a fastener that is adapted to pass through said rail and said housing when said housing is so-engaged in said channel, wherein said cleat is positioned in said recess by a position of the fastener.

23. A system as in claim 22, wherein said rail is linear.

24. A system as in claim 22, wherein said rail is curvilinear.

25. A system as in claim 22, wherein at least one end of said rail is open such that said channel can slidingly receive said cartridge assembly through said end.

26. A system as in claim 22, wherein said rail has at least one notch formed at a position along the length thereof for allowing said cartridge assembly to be received into said channel.

27. A system as in claim 22, further comprising means for releasably locking said cartridge assembly at a position along the length of said channel so-engaged.

* * * * *